United States Patent
Huang et al.

(10) Patent No.: US 12,155,751 B2
(45) Date of Patent: Nov. 26, 2024

(54) PROCESSOR WITH BLOCK CIPHER ALGORITHM, AND A DATA ENCRYPTION AND DECRYPTION METHOD OPERATED BY THE PROCESSOR

(71) Applicant: Shanghai Zhaoxin Semiconductor Co., Ltd., Shanghai (CN)

(72) Inventors: Zhenhua Huang, Beijing (CN); Yingbing Guan, Shanghai (CN); Yanting Li, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 223 days.

(21) Appl. No.: 17/837,674

(22) Filed: Jun. 10, 2022

(65) Prior Publication Data
US 2023/0067896 A1    Mar. 2, 2023

(30) Foreign Application Priority Data
Sep. 1, 2021    (CN) .......................... 202111019625

(51) Int. Cl.
*H04L 9/08*    (2006.01)
*H04L 9/00*    (2022.01)
*H04L 9/06*    (2006.01)

(52) U.S. Cl.
CPC ............ *H04L 9/0825* (2013.01); *H04L 9/002* (2013.01); *H04L 9/0618* (2013.01); *H04L 9/0866* (2013.01)

(58) Field of Classification Search
CPC ..... H04L 9/0825; H04L 9/002; H04L 9/0618; H04L 9/0866
See application file for complete search history.

(56) References Cited

U.S. PATENT DOCUMENTS

| | | | |
|---|---|---|---|
| 10,936,759 B1 * | 3/2021 | Chatterjee | G06F 21/602 |
| 2008/0292100 A1 * | 11/2008 | Komano | H04L 9/0618 |
| | | | 380/29 |
| 2010/0107249 A1 | 4/2010 | Krig | |
| 2010/0250966 A1 | 9/2010 | Olson | |
| 2011/0173452 A1 | 7/2011 | Nan | |
| 2012/0221847 A1 | 8/2012 | Ducharme | |
| 2012/0221852 A1 | 8/2012 | Ducharme | |

(Continued)

OTHER PUBLICATIONS

Non-Final Office Action dated Mar. 28, 2024, issued in U.S. Appl. No. 17/837,627.

(Continued)

*Primary Examiner* — Ryan J Jakovac
(74) *Attorney, Agent, or Firm* — McClure, Qualey & Rodack, LLP

(57) ABSTRACT

A processor with a block cipher algorithm and a data encryption and decryption method operated by the processor are shown. The processor uses a register to store an input key pointer pointing to an input key. In response to one single block cipher instruction of an instruction set architecture (ISA), the processor obtains input data from a first system memory area, performs the block cipher algorithm on the input data based on the input key indicated by the input key pointer stored in the register to encrypt or decrypt the input data to generate output data, and stores the output data in a second system memory area, or an internal storage area within the processor.

28 Claims, 7 Drawing Sheets

(56) References Cited

U.S. PATENT DOCUMENTS

| | | | |
|---|---|---|---|
| 2012/0328091 A1 | 12/2012 | Callen | |
| 2015/0039904 A1* | 2/2015 | Matsuda | H04L 9/0618 |
| | | | 713/189 |
| 2015/0143105 A1* | 5/2015 | Perrine | H04N 21/4181 |
| | | | 713/153 |
| 2016/0092688 A1 | 3/2016 | Wolrich | |
| 2019/0245686 A1 | 8/2019 | Rahimi | |
| 2020/0380140 A1* | 12/2020 | Medwed | G06F 21/6218 |
| 2021/0201409 A1 | 7/2021 | Hoshizuki | |
| 2021/0218547 A1* | 7/2021 | Weiler | H04L 9/0618 |
| 2023/0269076 A1 | 8/2023 | Brandt | |

OTHER PUBLICATIONS

Non-Final Office Action dated Apr. 24, 2024, issued in U.S. Appl. No. 17/837,582.
Non-Final Office Action dated Jul. 15, 2024, issued in U.S. Appl. No. 17/837,695.
Shen, S., et al.; "The SM3 Cryptographic Hash Function, draft-sca-cfrg-sm3-01;" Network Working Group; Jul. 2018; pp. 1-140.
Notice of Allowance dated Aug. 22, 2024, issued in U.S. Appl. No. 17/837,582.
Notice of Allowance dated Sep. 5, 2024, issued in U.S. Appl. No. 17/837,649.
Notice of Allowance dated Sep. 16, 2024, issued in U.S. Appl. No. 17/837,627.

* cited by examiner

202

| prefix | opcode | ModR/M | SIB | Displacement | Immediate |
|---|---|---|---|---|---|
| 0xF3 | 0x0F 0xA7 | 0xF0 | non | non | non |

204

| input registers | | output register |
|---|---|---|
| EAX | Control Word | ECX | 0 |
| ECX | the amount of 16-byte (128 bits) input blocks | ESI | increased every time the SM4 algorithm on one input block is finished |
| EBX | input key pointer | EDI | increased every time the SM4 algorithm on one input block is finished |
| ESI | input data pointer | | |
| EDI | output data pointer | | |

FIG. 2A

| 222 → | 0xF3 | 0x0F 0xA7 | 0xF0 | non | input data pointer | output data pointer |
|---|---|---|---|---|---|---|
| | prefix | opcode | ModR/M | SIB | InPointer | OutPointer |

| 224 → | input registers | | output register |
|---|---|---|---|
| EAX | Control Word | ECX | 0 |
| ECX | the amount of 16-byte (128 bits) input blocks | | |
| EBX | input key pointer | | |

FIG. 2C

PROCESSOR WITH BLOCK CIPHER ALGORITHM, AND A DATA ENCRYPTION AND DECRYPTION METHOD OPERATED BY THE PROCESSOR

CROSS REFERENCE TO RELATED APPLICATIONS

This application claims priority of China Patent Application No. 202111019625.9, filed on Sep. 1, 2021, the entirety of which is incorporated by reference herein.

BACKGROUND

Technical Field

The present application relates to a processor with a cryptographic algorithm and a data encryption and decryption method.

Description of the Related Art

The Organization of State Commercial Administration of China has issued a variety of cryptographic algorithms, including SM2, SM3, SM4 and other cryptographic algorithms, replacing RSA (abbreviated from Rivest-Shamir-Adleman), SHA (abbreviated from Secure Hash Algorithm), AES (Advanced Encryption Standard), and other international general cryptographic algorithms.

SM4 is a block cipher algorithm, which is applied to wireless local area network products. The data block length and the key length of SM4 are both 128 bits.

In the known technologies, multiple instruction set architecture (ISA) instructions are required to operate a processor to perform a block cipher algorithm. The intermediate data generated in the cryptographic procedure may be exposed between the ISA instructions, so the data security is poor.

How to perform an SM4 algorithm efficiently and more securely is an important area of research in this technical field.

BRIEF SUMMARY

A high-security processor with a block cipher algorithm (SM4) and a high security data encryption and decryption method for the block cipher algorithm (SM4) are presented.

A processor in accordance with an exemplary embodiment of the present application uses a first register to store an input key pointer, pointing to an input key. In response to one single block cipher instruction, the processor reads input data from a first system memory area, performs the block cipher algorithm on the input data based on the input key to encrypt or decrypt the input data to generate output data, and stores the output data in a second system memory area, or an internal storage area within the processor.

A data encryption and decryption method operated by a processor in accordance with an exemplary embodiment comprising: in response to one single block cipher instruction, reading input data from a first system memory area, performing a block cipher algorithm on the input data based on an input key to encrypt or decrypt the input data to generate output data, and storing the output data in a second system memory area or an internal storage area within the processor.

According to the processor and data encryption and decryption method with block cipher algorithm (e.g., SM4), just one single ISA instruction is required to perform the block cipher algorithm. The intermediate data generate in the cryptographic procedure can be safely protected within the processor and is not visible from outside the processor. The data security is considerably improved.

A detailed description is given in the following embodiments with reference to the accompanying drawings.

BRIEF DESCRIPTION OF THE DRAWINGS

The present application can be more fully understood by reading the subsequent detailed description and examples with references made to the accompanying drawings, wherein:

FIGS. 2A to 2C show examples regarding the instruction format of the ISA SM4 instruction, and further show the related design about the microcode UCODE;

DETAILED DESCRIPTION OF THE EMBODIMENTS

The following description is made for the purpose of illustrating the general principles of the application and should not be taken in a limiting sense. The scope of the application is best determined by reference to the appended claims.

The present application discloses a processor with a block cipher algorithm (SM4 algorithm), and proposes a block cipher instruction (SM4 instruction) that is an Instruction Set Architecture (ISA) instruction. In an exemplary embodiment, the microcode (UCODE) of the processor is specially designed for the SM4 instruction, and there is a block cipher algorithm accelerator (SM4 engine) in an encryption and decryption unit of the processor. The processor decodes the SM4 instruction to microinstructions according to the microcode. According to the microinstructions, the contents in the architectural registers are interpreted and used in operating the SM4 engine to implement the SM4 algorithm. The instruction set supported by the processor may include an x86 instruction set. The intermediate data generated during the SM4 algorithm (for example, the extended keys, or the intermediate calculation data generated before getting the output data based on the input data) can be safely hidden in the internal storage space within the processor.

Figure 1:
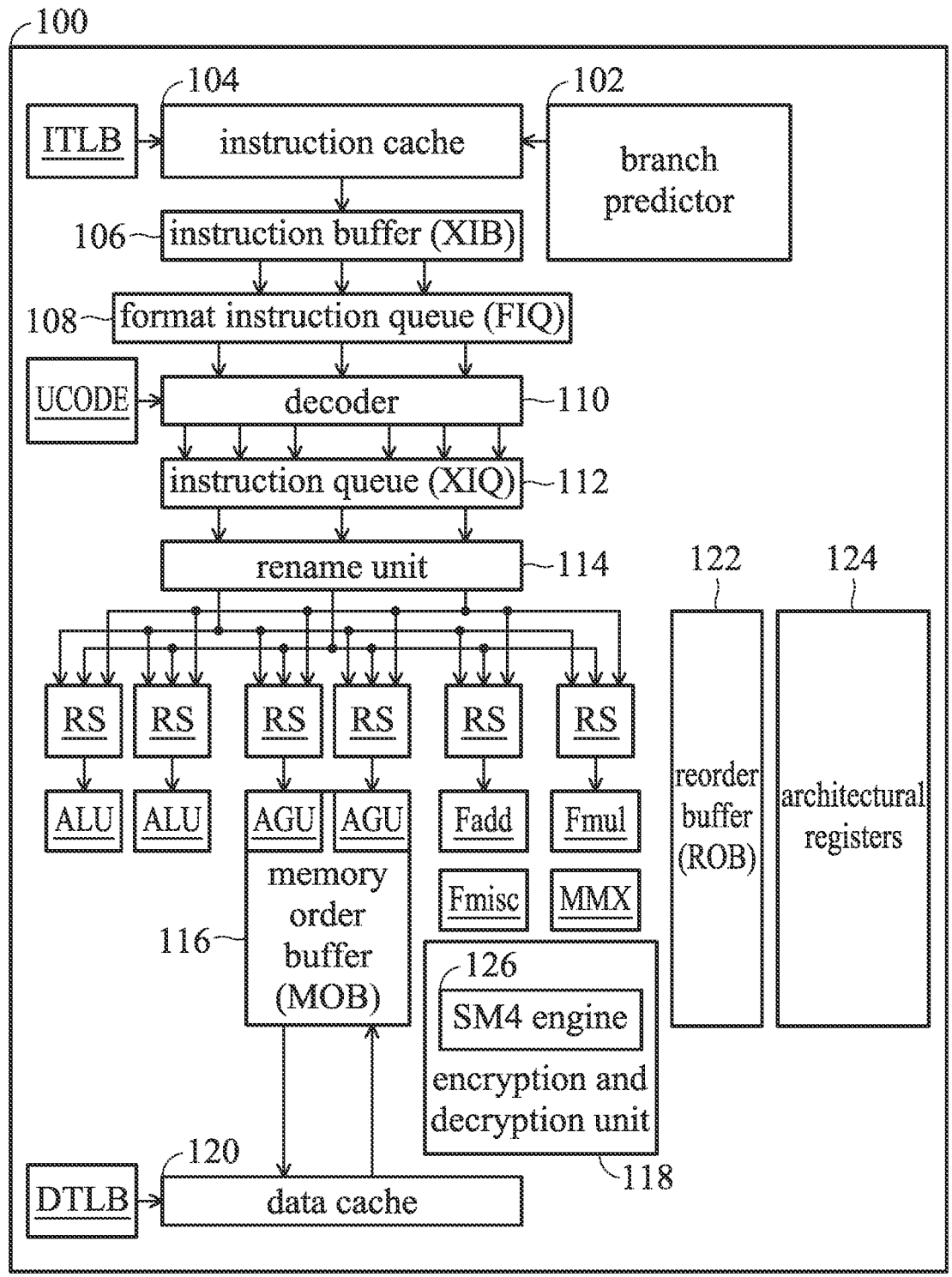
FIG. 1 is a block diagram illustrating a processor 100 in accordance with an exemplary embodiment of the present application.

FIG. 1 is a block diagram illustrating a processor 100 in accordance with an exemplary embodiment of the present application. According to a branch predictor 102, instructions are loaded into the instruction cache 104 by checking an instruction translation lookaside buffer (ITLB), and then buffered in an instruction buffer (XIB) 106, and then pushed into a format instruction queue (FIQ) 108 waiting to be decoded by the decoder 110. Based on microcode (UCODE, stored in a microcode storage device), the decoder 110 decodes the received instructions into microinstructions which can be recognized by the pipelined hardware of the processor 100. The microinstructions are pushed into an instruction queue (XIQ) 112, and then are issued into the corresponding reservation stations RS via a rename unit 114, to drive the arithmetic logical unit ALU, address generating units AGU of a memory order buffer (MOB) 116, hardware Fadd, Fmul, Fmisc, and MMX, or an encryption and decryption unit 118. The data required in calculations may be loaded into a data cache 120 by checking a data translation lookaside buffer DTLB, and then stored in the memory order buffer (MOB) 116. The processor 100 further includes a reorder buffer (ROB) 122, and architectural registers 124 required in the operations.

The encryption and decryption unit 118 includes an SM4 engine 126. In the microcode UCODE, there are microinstructions about accessing the architectural registers 124 in response to the SM4 instruction. For example, there are microinstructions operative to read a register storing a control word (that shows whether to perform encryption or decryption, and shows operating the SM4 algorithm in what mode), to read a register recording the amount of 16-byte input blocks carried in the input data, to read a register recording an input key pointer, or even to read a register storing information about the input and output data. Based on the microcode UCODE, the decoder 110 decodes the SM4 instruction (which is an ISA instruction) into a plurality of microinstructions that can be recognized by the pipelined hardware of the processor 100, and interprets the contents of the architecture registers 124 to obtain the control word, input key. According to the microinstructions, the control word, the input key, and the input data are read from the architectural registers 124 to drive the SM4 engine 126. Based on the input key, the SM4 engine 126 encrypts or decrypts the input data according to the SM4 algorithm, and generates the output data. The output data may be written into a system memory (e.g., a random access memory RAM, which may follow the ES segmentation technology), or be written into an internal storage area (e.g., a storage space within the processor 100). The decoded microinstructions include an engine driving microinstruction (an SM4 engine microinstruction), which is operative to drive the SM4 engine 126. Furthermore, the decoded microinstructions are operative to read and update the architectural registers 124, and operate the encryption and decryption unit 118 to perform the SM4 algorithm on the input data based on the input key.

Figure 2B:
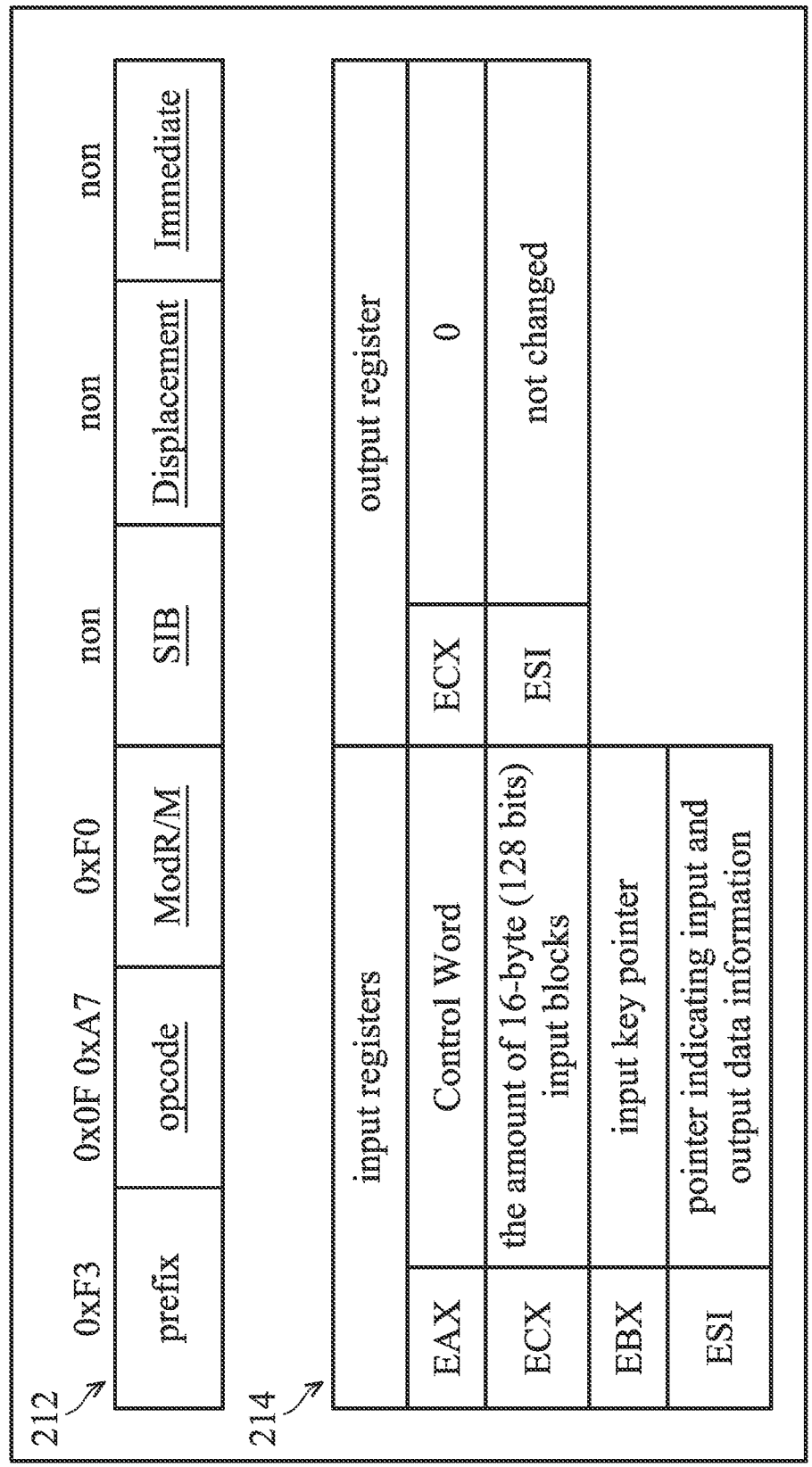

FIGS. 2A to 2C show examples regarding the instruction format of the ISA SM4 instruction, and further show the related design about the microcode UCODE.

FIG. 2A illustrates an instruction format 202 of the ISA SM4 instruction, and presents a table 204 to introduce the related design in the microcode UCODE. The prefix, opcode, and ModR/M fields presented in the instruction format 202 are filled: 0xF3 0x0F 0xA7 0xF0. The SIB, Displacement, and Immediate fields are not filled (non). When recognizing the code "0xF3 0x0F 0xA7 0xF0", the decoder 110 decodes the ISA SM4 instruction, based on the microcode UCODE, into a plurality of microinstructions. According to the microinstructions, the contents in the architectural registers 124 are defined, read and updated. Based on the contents in the architectural registers 124, the encryption and decryption unit 118 including the SM4 engine 126 is operated to perform the SM4 algorithm on input data based on an input key.

First, referring to the table 204, the following discussion is about how the microcode UCODE defines input registers for the ISA SM4 instruction. The input registers include the EBX register (the first register), the ECX register (the second register), the EAX register (the third register), the ESI register (the fourth register), and the EDI register (the fifth register) in the architectural registers 124.

The third register EAX stores a control word, which includes a plurality of bits. Bit[0] of the control word is an encryption and decryption setting bit, and it indicates an encryption operation by "0", and indicates a decryption operation by "1". Bit[10:6] of the control word indicates the SM4 mode, where "1" refers to an electronic code book (ECB) mode, "2" refers to a cipher block chaining (CBC) mode, "4" refers to a cipher feedback (CFB) mode, "8" refers to an output feedback (OFB) mode, and "10" refers to a counter (CTR) mode. The second register ECX stores the amount of 16-byte (128 bits) input blocks carried in the input data. The first register EBX stores an input key pointer pointing to a system memory area storing an input key, which may follow the ES segmentation technology. The fourth register ESI stores an input data pointer pointing to another system memory area that stores input data, which may follow the ES segmentation technology. When the control word indicates an encryption operation, the input data pointer stored in ESI register points to a section of plaintext. When the control word indicates a decryption operation, the input data pointer stored in ESI register points to a section of ciphertext. The fifth register EDI stores an output data pointer indicating where to store the output data, which may follow the ES segmentation technology. When the control word indicates an encryption operation, the output data pointer stored in EDI register points to a system memory area for storage of a section of ciphertext. When the control word indicates a decryption operation, the output data pointer stored in EDI register points to a system memory area for storage of a section of plaintext.

In addition, Table 204 further shows what architectural registers are defined as output registers in the microcode UCODE corresponding to the SM4 instruction. When the SM4 algorithm on all input blocks is finished, the second register ECX is cleared to 0. In an exemplary embodiment, every time the SM4 algorithm on one input data block is finished, the input data pointer in the fourth register ESI and the output data pointer in the fifth register EDI are increased. After performing the SM4 algorithm on the whole input data, the displacement increased on the value stored in the fourth register ESI reaches the byte number of the input data, and the displacement increased on the value stored in the fifth register EDI reaches the byte number of the output data.

Note that the input and output registers may have the other design, depending on the user's requirements.

FIG. 2B illustrates another instruction format 212 of the ISA SM4 instruction, and presents a table 214 to introduce the related design in the microcode UCODE. The instruction format 212 is the same as the instruction format 202. When recognizing the code "0xF3 0x0F 0xA7 0xF0", the decoder 110 decodes the ISA SM4 instruction, based on the microcode UCODE, into a plurality of microinstructions. According to the microinstructions, the contents in the architectural registers 124 are defined, read and updated and, based on the contents in the architectural registers 124, the encryption and decryption unit 118 including the SM4 engine 126 is operated to perform the SM4 algorithm on the input data based on an input key. In another exemplary embodiment, the code for recognizing the instruction format 212 is different from the code "0xF3 0x0F 0xA7 0xF0" representing the instruction format 202. In this way, the processor may execute various SM4 instructions with different instruction formats.

Different from Table 204 which shows that according to the design of the microcode UCODE the fourth register ESI stores an input data pointer and the fifth register EDI stores an output data pointer, Table 214 shows that according to the design of the microcode UCODE the fourth register ESI stores an input and output information pointer. The input and output information pointer points to a system memory area storing an input data pointer pointing to the input data stored in the system memory and an output data pointer pointing to the output data stored in the system memory. As being used as an output register (referring to Table 214) for SM4 algorithm, the contents in the fourth register ESI are not changed by the microcode UCODE when the SM4 algorithm is finished.

FIG. 2C illustrates another instruction format 222 of the ISA SM4 instruction, and presents a table 224 to introduce the related design in the microcode UCODE. Different from the instruction format 202/212, the instruction format 212 further provides two fields InPointer and OutPointer storing an input data pointer and output data pointer, respectively. The input data pointer points to input data stored in the system memory. The output data pointer indicates a storage space in the system memory for storage of the output data. When recognizing the code "0xF3 0x0F 0xA7 0xF0" (or any code specifically designed to recognize the instruction format 222), the decoder 110 decodes the ISA SM4 instruction, based on the microcode UCODE, into a plurality of microinstructions. According to the microinstructions, the contents in the architectural registers 124 are defined (referring to table 224), read and updated. Based on the contents in the architectural registers 124, the encryption and decryption unit 118 including the SM4 engine 126 is operated to perform SM4 algorithm on the input data according to an input key. As shown in table 224, according to the microcode UCODE, none of the architectural registers 124 are used to provide information about the input and output data. In an exemplary embodiment, the two fields InPointer and OutPointer each are 32 bits.

Figure 3:
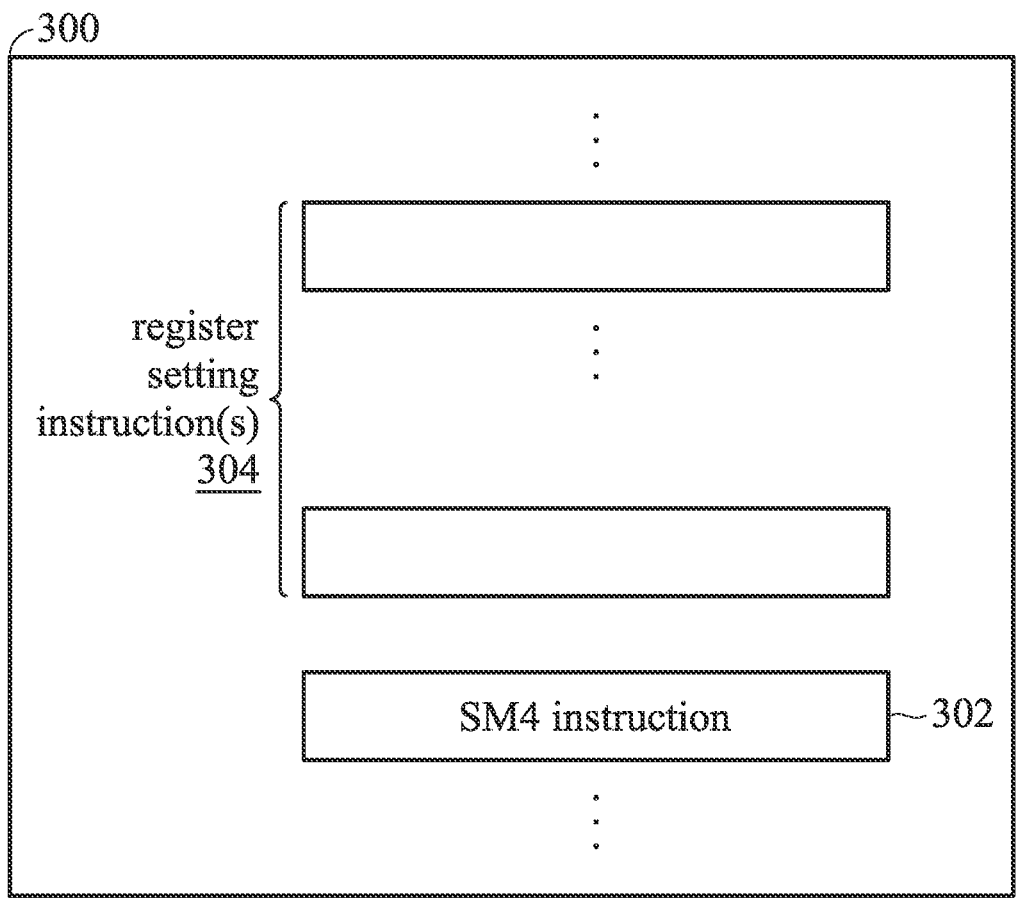
FIG. 3 illustrates the programming of ISA instructions in accordance with an exemplary embodiment of the present application.

FIG. 3 illustrates the programming of ISA instructions in accordance with an exemplary embodiment of the present application. In the program code 300, there may include an SM4 instruction 302 in the above format 202, 212, or 222, and may further include register setting instruction(s) 304 prior to the SM4 instruction 302. According to the register setting instruction(s) 304, the architectural registers 124 are filled to contain the information required during the execution of the SM4 instruction 304.

Figure 4:
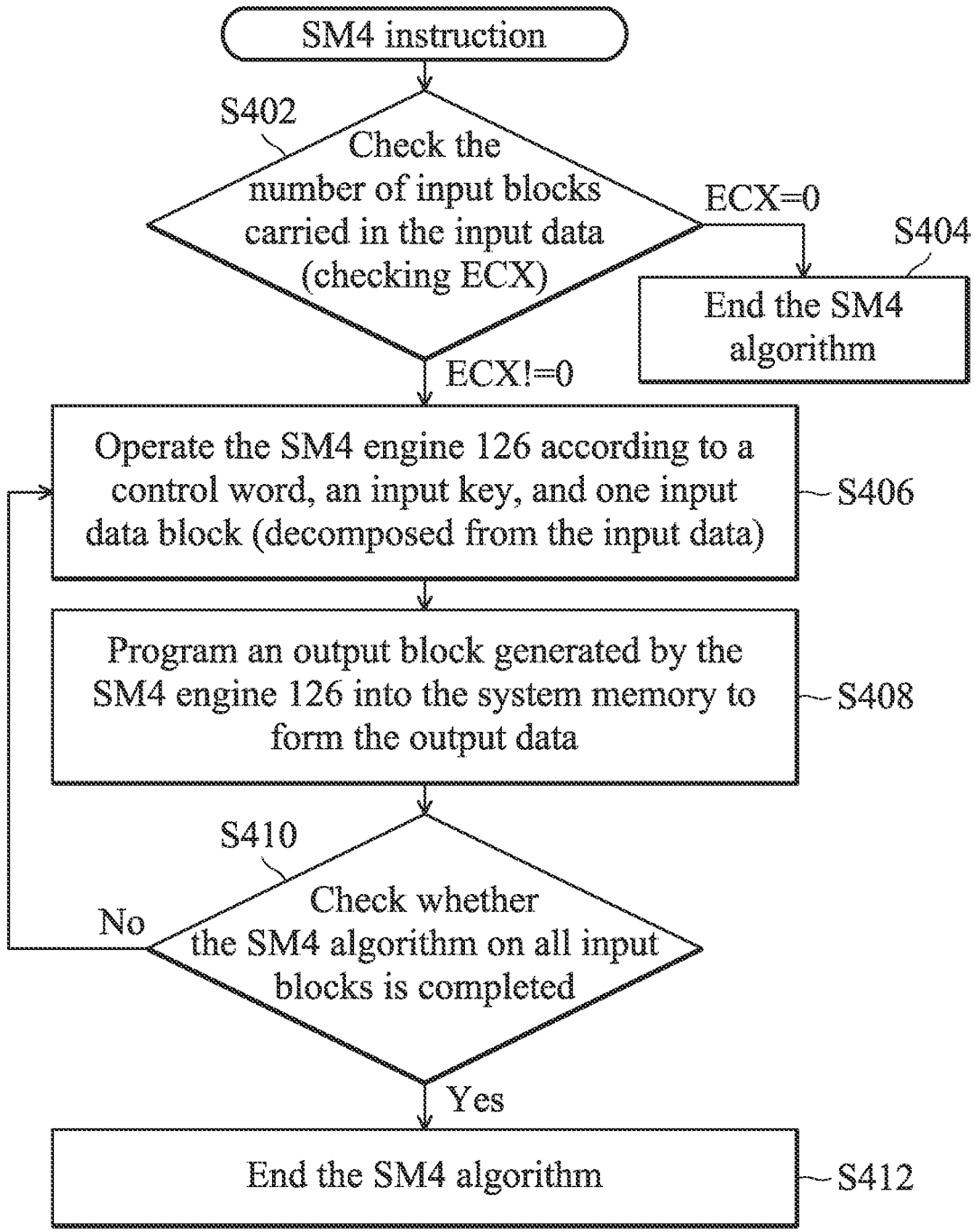
FIG. 4 is a flow chart, illustrating a procedure called by the SM4 algorithm in accordance with an exemplary embodiment of the present application.

FIG. 4 is a flow chart, illustrating a procedure of the SM4 algorithm in accordance with an exemplary embodiment of the present application. The illustrated steps may correspond to the microinstructions decoded from the ISA SM4 instruction.

Step S402 checks the number of input blocks carried in the input data (for example, reading the second register ECX). If the number of input blocks is 0 (ECX is 0), step S404 is performed to end the SM4 algorithm. If the block number is not 0 (ECX is not 0), step S406 is performed to operate the SM4 engine 126 according to a control word, an input key, and one input data block (decomposed from the input data). In step S408, an output block generated by the SM4 engine 126 is programmed into the system memory to form the output data. Then, the SM4 engine 126 subtracts 1 from the value in the second register ECX. Step S410 checks whether the SM4 algorithm on all input blocks is completed. For example, check whether the second register ECX is 0. If ECX is non-zero, the procedure returns to step S406 to operate the SM4 engine 126 according to the control word, the input key, and the next input block. If ECX is 0, the flow proceeds to step S412 to end the SM4 algorithm. In another exemplary embodiment, the step that the SM4 engine 126 performs to subtract 1 from the value in the second register ECX is arranged after step S406 and prior to step S408.

The engine driving microinstruction corresponds to the step S406 that operates the SM4 engine 126 to complete the SM4 algorithm on each input block.

Figure 5:
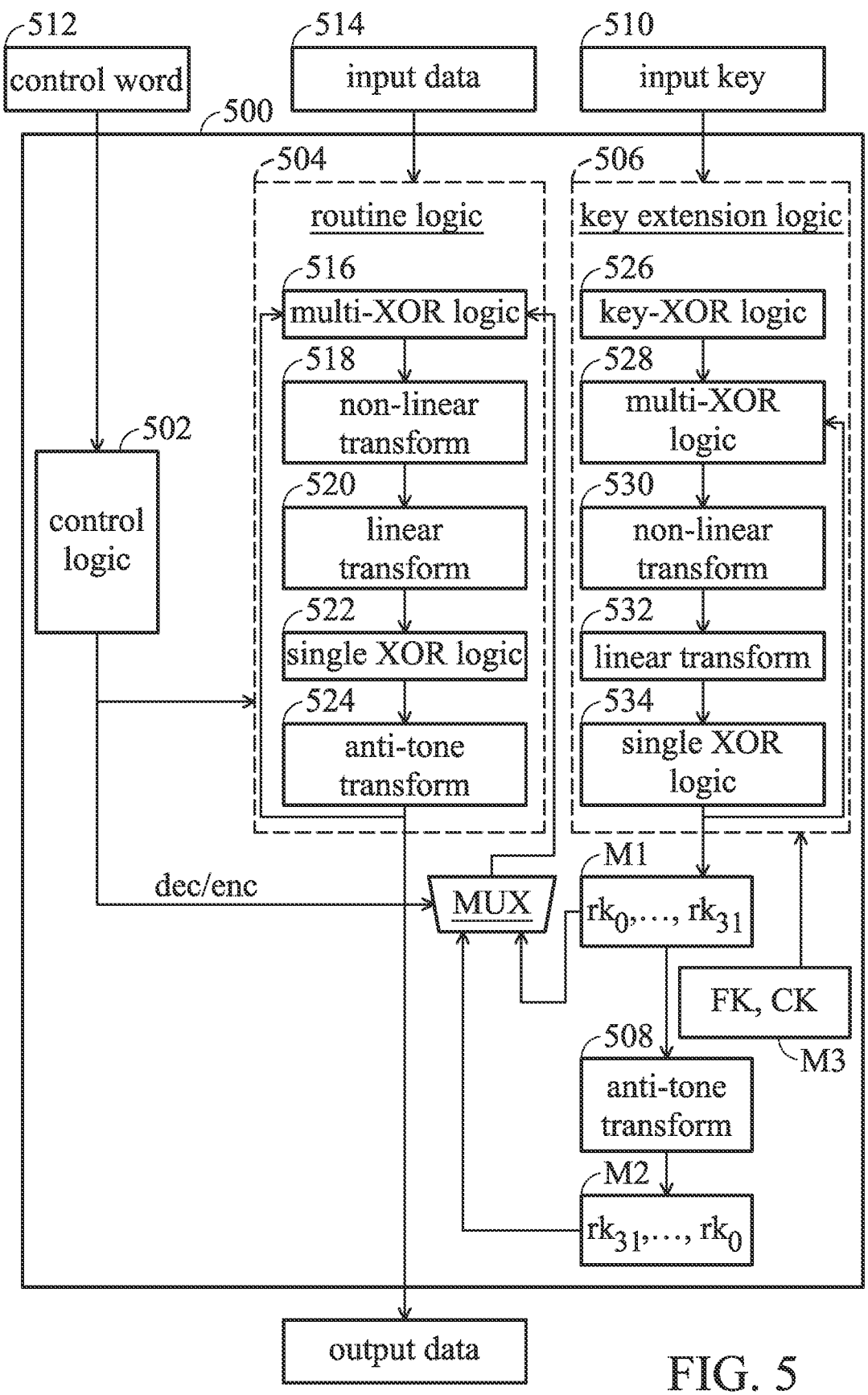
FIG. 5 illustrates an SM4 engine 500 in accordance with an exemplary embodiment of the present application.

FIG. 5 illustrates an SM4 engine 500 in accordance with an exemplary embodiment of the present application, including hardware for implementing a control logic 502, a routine logic 504, a key extension logic 506, and an anti-tone transform 508. The SM4 engine 500 further provides internal storage spaces M1~M3 and a multiplexer MUX.

According to the input key pointer stored in the second register EBX, an input key 510 is read from the system memory and entered the SM4 engine 500. Based on the input key 510, the key extension logic 506 generates 32 keys $rk_0 \ldots rk_{31}$ required in the 32 rounds of calculation of each input block, and stores the 32 keys $rk_0 \ldots rk_{31}$ in the internal storage space M1 within the SM4 engine 500 as the 32 sequential keys. The anti-tone transform 508 reverses the order of the 32 sequential keys $rk_0 \ldots rk_{31}$, and stores the 32 reversed-order keys $rk_{31} \ldots rk_0$ in another internal storage space M2 within the SM4 engine 500. The 32 sequential keys $rk_0 \ldots rk_{31}$ as well as the 32 reversed-order keys $rk_{31} \ldots rk_0$ are sent to the multiplexer MUX.

The control word 512 is read from the third register EAX. According to the control word 512, the control logic 502 provides a selection signal dec/enc to switch the multiplexer MUX between encryption and decryption. Depending on the selection signal dec/enc, the routine logic 504 receives the sequential keys $rk_0 \ldots rk_{31}$ for encryption, or the reversed-order keys $rk_{31} \ldots rk_0$ for decryption.

The input data 514 is read from the system memory, and is entered to the routine logic 504 block by block. The routine logic 504 uses the 32 keys received from the multiplexer MUX to perform 32 rounds of calculation for encryption or 32 rounds of calculation for decryption on each input block.

The routine logic 504 includes a multi-XOR logic 516, a non-linear transform 518, a linear transform 520, a single XOR logic 522, and an anti-tone transform 524. The routine logic 504 performs 32 rounds of calculation on each target input block $(X_0, X_1, X_2, X_3) \in (Z_2^{32})^4$ based on the keys $k_i \in Z_2^{32}, i=0, 1, 2, \ldots 31$ received from the multiplexer MUX. The same hardware is used in encryption and decryption. The internal hardware design is as follows.

The multi-XOR logic 516 performs the following calculations:

$$(X_{i+1} \wedge X_{i+2} \wedge X_{i+3} \wedge k_i)$$

where '$\wedge$' refers to a 32-bit exclusive OR calculation.

The non-linear transform 518 performs the following calculations:

$B=t(A)$, which is $(b_0, b_1, b_2, b_3)=(Sbox(a_0), Sbox(a_1), Sbox(a_2), Sbox(a_3))$, where:

'Sbox' refers to an S-box operation, which is a fixed swap between 8-bit input and 8-bit output;

'A' is the input of the hardware block 518, $A=(a_0, a_1, a_2, a_3) \in (Z_2^8)^4$.

'B' is the output of the hardware block 518, $B=(b_0, b_1, b_2, b_3) \in (Z_2^8)^4$.

The linear transform 520 performs the following calculations:

$$L(B)=B \wedge (B<<<2) \wedge (B<<<10) \wedge (B<<<18) \wedge (B<<<24)$$

where '<<<i' refers to a cyclic left shift of i bits, which is performed on 32-bit data.

The single XOR logic 522 performs the following calculations:

$$X_{i+4} = X_i \wedge T(X_{i+1} \wedge X_{i+2} \wedge X_{i+3} \wedge k_i)$$

where "T" refers to a reversible transform, $T(X_{i+1} \wedge X_{i+2} \wedge X_{i+3} \wedge k_i)$ is the calculation result of the nonlinear transform 518 and the linear transform 520, and $T(.)=L(t(.))$.

The anti-tone transform 524 performs the following calculations:

$$R(A_0, A_1, A_2, A_3) = (A_3, A_2, A_1, A_0)$$

A is the input of the hardware block 524. After 32 rounds of calculation, the anti-tone transform 524 outputs an output block $(Y_0, Y_1, Y_2, Y_3) \in (Z_2^{32})^4$ corresponding to the target input block $(X_0, X_1, X_2, X_3)$, and the output block $(Y_0, Y_1, Y_2, Y_3)$ is $R(X_{32}, X_{33}, X_{34}, X_{35})$, which is $(X_{35}, X_{34}, X_{33}, X_{32})$.

For encryption, $(X_0, X_1, X_2, X_3) \in (Z_2^{32})^4$ is plaintext input, and the keys adopted in the 32 rounds of calculation are the 32 sequential keys, $rk_i \in Z_2^{32}$, $i=0, 1, 2, \ldots 31$, taken from the internal storage space M1 of the SM4 engine.

For decryption, $(X_0, X_1, X_2, X_3) \in (Z_2^{32})^4$ is ciphertext input, and the keys adopted in the 32 rounds of calculation are 32 reversed-order keys, $rk_i \in Z_2^{32}$, $i=31, 30, 29, \ldots 0$, taken from the internal storage space M2 of the SM4 engine.

Key extension logic 506 includes hardware for a key-XOR logic 526, a multi-XOR logic 528, a non-linear transform 530, a linear transform 532, and a single XOR logic 534. The key extension logic 506 operates based on the input key 510 ($MK = (MK_0, MK_1, MK_2, MK_3)$, where $MK_0, MK_1, MK_2, MK_3$ are 32 bits each), a system parameter FK (which is ($FK_0, FK_1, FK_2, FK_3$), where $FK_0, FK_1, FK_2, FK_3$ are 32 bits each), and a fixed parameter CK (which is ($CK_0, CK_1, \ldots, CK_{31}$), where $CK_0, CK_1, \ldots, CK_{31}$ are 32 bits each). The system parameter FK and the fixed parameter CK can be read from the internal storage space M3. The internal hardware design of the key extension logic 506 is as follows.

The key-XOR logic 526 performs the following calculations:

$(K_0, K_1, K_2, K_3) = (MK_0 \wedge FK_0, MK_1 \wedge FK_1, MK_2 \wedge FK_2, MK_3 \wedge FK_3)$ where "$\wedge$" refers to a 32-bit exclusive OR calculation.

The multi-XOR logic 528 performs the following calculations:

$$(K_{i+1} \wedge K_{i+2} \wedge K_{i+3} \wedge CK_i)$$

The non-linear transform 530 performs the following calculations:

$$B = t(A), \text{that is} (b_0, b_1, b_2, b_3) = (Sbox(a_0), Sbox(a_1), Sbox(a_2), Sbox(a_3)),$$

where:

Sbox refers to an S-box operation, which is a fixed swap between 8-bit input and 8-bit output;

'A' is the input of the hardware block 530, and $A = (a_0, a_1, a_2, a_3) \in (Z_2^8)^4$.

'B' is the output of the hardware block 530, and $B = (b_0, b_1, b_2, b_3) \in (Z_2^8)^4$.

The linear transform 532 performs the following calculations:

$$L'(B) = B \wedge (B <<< 13) \wedge (B <<< 23)$$

where '<<<i' refers to a cyclic left shift of i bits, which is performed on 32-bit data.

The single XOR logic 534 performs the following calculations:

$$rk_i = K_{i+4} = K_i \wedge T'(K_{i+1} \wedge X_{i+2} \wedge X_{i+3} \wedge CK_i)$$

where T' is a reversible conversion, $T'(K_{i+1} \wedge X_{i+2} \wedge X_{i+3} " CK_i)$ is the calculation result of the nonlinear conversion 530 and the linear conversion 532, and $T'(.) = L'(t(.))$. $rk_i$, $i=0, \ldots, 31$ are calculated in sequence and stored in the internal storage space M1 within the SM4 engine 500, and the anti-tone transform 508 performs a reverse order conversion to form the reversed-order keys and stores them in the internal storage space M2 within the SM4 engine 500.

The extension keys $rk_i$ (in the sequential order or in the reversed order) are safely protected within the SM4 engine 500. Even the routine logic 504 and the key extension logic 506 safely protect the intermediate data of the rounding calculations and the key extension calculations in the SM4 engine 500. In such a design, a higher security hardware is provided for performing the SM4 cipher algorithm.

In an exemplary embodiment, the processor performs N rounds of calculation on each input block to transform each input block into an output block, and the output blocks corresponding to the different input blocks are combined to form the output data, where N is an integer. The processor generates N extension keys based on an input key, so that for each input block different extension keys are adopted in the different rounds of calculation. N is not limited to 32.

In an exemplary embodiment, the encryption and decryption unit 118 does not include the specifically designed SM4 engine 126. The microcode UCODE is specially designed to transform an ISA SM4 instruction into a plurality of microinstructions to operate the existing arithmetic logic units ALUs to complete an SM4 algorithm. In such an exemplary embodiment, the intermediate data generated during the calculations of the SM4 algorithm is safely protected within the internal storage space of the processor, too.

In an exemplary embodiment, the SM4 engine is not as powerful as the foregoing SM4 engine 500. Some functional modules of the SM4 engine 500 (for example, the key extension logic 506) are implemented by the existing arithmetic logic units ALUs which are operated by microinstructions generated according to a specially designed microcode UCODE. This embodiment can also protect important intermediate data of the SM4 algorithm in the internal storage space of the processor.

In summary, a processor in accordance with an exemplary embodiment of the present application includes an encryption and decryption unit, a set of architectural registers, a microcode storage device storing microcode, and a decoder. In response to a block cipher instruction (e.g., an SM4 instruction) of an instruction set architecture (ISA), the decoder generates, based on the microcode, a plurality of microinstructions. According to the microinstructions, the architectural registers are defined, accessed and managed. According to the architectural registers, the plurality of microinstructions operate the encryption and decryption unit to perform a block cipher algorithm (SM4 algorithm) to transform input data into output data based on an input key. Extension keys originated from the input key for performing the block cipher algorithm on the input data are protected in the internal storage space within the processor, thereby greatly improving the data security. In this case, a special ISA SM4 instruction is proposed for the SM4 algorithm.

In the known technology, more than one ISA instructions are required to operate a conventional processor to perform a block cipher algorithm, the intermediate data generated during the block cipher algorithm may be exposed between the different ISA instructions and cannot be safely protected. However, for the proposed processor with SM4 encryption and decryption, or the data encryption and decryption method introduced in the present application, only one single ISA instruction is enough to operate the proposed processor to perform a block cipher algorithm, so that the intermediate data generated during the block cipher algorithm is protected within the internal storage space of the processor without being accessed from outside the processor. Data security is significantly improved.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A processor with a block cipher algorithm, comprising:
    a first register, storing an input key pointer pointing to an input key; and
    a third register storing a control word that includes a plurality of mode setting bits for setting the block cipher algorithm to operate in an electronic code book mode, a cipher block chaining mode, a cipher feedback mode, an output feedback mode, and a counter mode;
    wherein, in response to one single block cipher instruction, the processor reads input data from a first system memory area, performs the block cipher algorithm on the input data based on the input key to encrypt or decrypt the input data to generate output data, and stores the output data in a second system memory area or an internal storage area within the processor.

2. The processor as claimed in claim 1, wherein:
    the single block cipher instruction is executed according to the input key pointer pointing to the input key, an input data pointer pointing to the input data, and an output pointer indicating where to store the output data.

3. The processor as claimed in claim 1, wherein:
    according to an amount of input blocks carried in the input data, the processor divides the input data into input blocks;
    the processor performs N rounds of calculation on each input block to transform each input block into an output block, the output blocks corresponding to the different input blocks are combined to form the output data, and N is an integer; and
    based on the input key, the processor generates N extension keys corresponding to the N rounds of calculation.

4. The processor as claimed in claim 3, further comprising:
    a second register, storing the amount of input blocks carried in the input data.

5. The processor as claimed in claim 1, wherein:
    the third register further stores an encryption and decryption setting bit for setting the processor that operates according to the block cipher algorithm to encrypt or decrypt the input data based on the input key.

6. The processor as claimed in claim 1, further comprising:
    a fourth register, storing an input data pointer pointing to the first system memory area,
    wherein, along with the execution of the block cipher algorithm, the processor increases the input data pointer stored in the fourth register according to a byte number of the input data.

7. The processor as claimed in claim 6, further comprising:
    a fifth register, storing an output data pointer pointing to the second system memory area,
    wherein, along with the execution of the block cipher algorithm, the processor increases the output data pointer stored in the fifth register according to a byte number of the output data.

8. The processor as claimed in claim 1, further comprising:
    a fourth register, storing an input and output information pointer pointing to a third system memory area that stores an input data pointer pointing to the first system memory area and an output data pointer pointing to the second system memory area.

9. The processor as claimed in claim 1, wherein:
    an input data pointer pointing to the first system memory area and an output data pointer pointing to the second system memory area are entered as two operands of the single block cipher instruction.

10. The processor as claimed in claim 1, further comprising:
    an encryption and decryption unit;
    a set of architectural registers which provides the first register;
    a microcode storage device, storing microcode; and
    a decoder, transforming the single block cipher instruction into a plurality of microinstructions based on the microcode,
    wherein:
    according to the plurality of microinstructions, the set of architectural registers is read and managed, and the encryption and decryption unit performs the block cipher algorithm on the input data based on the input key.

11. The processor as claimed in claim 10, wherein:
    the encryption and decryption unit includes a block cipher engine;
    the plurality of microinstructions include an engine driving microinstruction; and
    in response to the engine driving microinstruction, the block cipher engine performs N rounds of calculation on each input block of the input data to transform each input block into one output block, wherein the output blocks corresponding to the different input blocks are combined to form the output data, and N is an integer.

12. The processor as claimed in claim 11, wherein the block cipher engine comprises:
    hardware for a key extension logic, receiving the input key, and transforming the input key into N extended keys to correspond to the N rounds of calculation of each input block; and
    a first internal storage space, storing the N extended keys as N sequential keys for encryption in the generation order of the N extended keys, wherein the first internal storage space is in the block cipher engine.

13. The processor as claimed in claim 12, wherein the block cipher engine further comprises:
    hardware for anti-tone transform for keys, reversing the order of the N sequential keys read from the first internal storage space to generate N reversed-order keys; and a second internal storage space, storing the N reversed-order keys for decryption, wherein the second internal storage space is in the block cipher engine.

14. The processor as claimed in claim 13, wherein the block cipher engine further comprises:
a multiplexer, and hardware for a routine logic, wherein the multiplexer outputs the N sequential keys read from the first internal storage space or the N reversed-order keys read from the second internal storage space to the routine logic, and, according to the N sequential keys or the N reversed-order keys transferred from the multiplexer, the routine logic performs the N rounds of calculation on each input block to transform each input block into an output block; and
hardware for control logic, wherein, when an encryption and decryption setting bit indicates an encryption operation, the control logic operates the multiplexer to transfer the N sequential keys to the routine logic, and when the encryption and decryption setting bit indicates a decryption operation, the control logic operates the multiplexer to transfer the N reversed-order keys to the routine logic.

15. The processor as claimed in claim 13, wherein:
the hardware for key extension logic comprises hardware for key-XOR logic, hardware for multi-XOR logic, hardware for non-linear transform, hardware for linear transform, and hardware for single XOR logic, which are connected in series.

16. The processor as claimed in claim 15, wherein the block cipher engine further comprises:
a third internal storage space, storing a system parameter FK, and a fixed parameter CK;
FK is $(FK_0, FK_1, FK_2, FK_3)$, where $FK_0, FK_1, FK_2, FK_3$ are 32 bits each, CK is $(CK_0, CK_1, \ldots, CK_{31})$, where $CK_0, CK_1, \ldots, CK_{31}$ are 32 bits each, and the third internal storage space is in the block cipher engine.

17. The processor as claimed in claim 16, wherein:
the input key sent to the hardware for key extension logic is MK, MK is $(MK_0, MK_1, MK_2, MK_3)$, and $MK_0, MK_1, MK_2, MK_3$ are 32 bits each;
the hardware for key extension logic reads FK and CK from the third internal storage space;
the hardware for key-XOR logic performs following calculations:

$(K_0, K_1, K_2, K_3) = (MK_0 \wedge FK_0, MK_1 \wedge FK_1, MK_2 \wedge FK_2, MK_3 \wedge FK_3)$ the hardware for multi-XOR logic performs 32-bit XOR calculations:

$(K_{i+1} \wedge K_{i+2} \wedge K_{i+3} \wedge CK_i)$;

the hardware for non-linear transform performs the following calculations B=t(A), that is
$(b_0, b_1, b_2, b_3) = (Sbox(a_0), Sbox(a_1), Sbox(a_2), Sbox(a_3))$,
wherein:
Sbox refers to an S-box operation, which is a fixed swap between 8-bit input and 8-bit output;
$A=(a_0, a_1, a_2, a_3)\varepsilon(Z_2^8)^4$, which is an input of the hardware for non-linear transform;
and
$B=(b_0, b_1, b_2, b_3)\varepsilon(Z_2^8)^4$, which is an output of the hardware for non-linear transform;
the hardware for linear transform performs the following calculations:
$L'(B)=B \wedge (B<<<13) \wedge (B<<<23)$; and
the hardware for single XOR logic performs the following calculations:

$rk_i = K_{i+4} = K_i T' (K_{i+1} \wedge X_{i+2} \wedge X_{i+3} \wedge CK_i)$, wherein $rk_i$ (i=0, . . . , 31) are 32 sequential keys for the encryption operation, and $T'(.)=L'(t(.))$.

18. The processor as claimed in claim 17, wherein:
the hardware for anti-tone transform for keys performs a transform R(.), which is:
$R(rk_0, rk_1, \ldots, rk_{31})=(rk_{31}, rk_{30}, \ldots, rk_0)$, and 32 reversed-order keys $rk_{31}, rk_{30}, \ldots, rk_0$ are generated.

19. The processor as claimed in claim 14, wherein:
the hardware for routine logic comprises hardware for multi-XOR logic, hardware for non-linear transform, hardware for linear transform, hardware for single XOR logic, and hardware for anti-tone transform for keys, which are connected in series.

20. The processor as claimed in claim 19, wherein:
the hardware for routine logic reads a target input block, $(X_0, X_1, X_2, X_3)\varepsilon(Z_2^{32})^4$, from the first system memory area, and receives keys, $k_i\varepsilon Z_2^{32}$, i=0, 1, 2, . . . 31, from the multiplexer;
corresponding to the encryption operation, the keys $k_i$ are the 32 sequential keys obtained from the first internal storage space;
corresponding to the decryption operation, the keys $k_i$ are the 32 reversed-order keys obtained from the second internal storage space;
the hardware for multi-XOR logic performs a 32-bit exclusive OR calculation $(X_{i+1} \wedge X_{i+2} \wedge X_{i+3} \wedge K_i)$;
the hardware for non-linear transform performs the following calculations B=t(A), that is $(b_0, b_1, b_2, b_3) = (Sbox(a_0), Sbox(a_1), Sbox(a_2), Sbox(a_3))$,
wherein:
Sbox refers to an S-box operation, which is a fixed swap between 8-bit input and 8-bit output;
$A=(a_0, a_1, a_2, a_3)\varepsilon(Z_2^8)^4$, which is an input of the hardware for non-linear transform;
and
$B=(b_0, b_1, b_2, b_3)\varepsilon(Z_2^8)^4$, which is an output of the hardware for non-linear transform;
the hardware for linear transform performs the following calculations:

$L(B)=B \wedge (B<<<2) \wedge (B<<<10) \wedge (B<<<18) \wedge (B<<<24)$;

the hardware for single XOR logic performs the following calculations:
$X_{i+4}=X_i \wedge T(X_{i+1} \wedge X_{i+2} \wedge X_{i+3} \wedge k_i)$, where $T(.)=L(t(.))$; and
the hardware for anti-tone transform for keys performs the following calculations:
$R(X_{32}, X_{33}, X_{34}, X_{35})=(X_{35}, X_{34}, X_{33}, X_{32})$,
wherein $(X_{35}, X_{34}, X_{33}, X_{32})$ is an output block corresponding to the target input block, and is $(Y_0, Y_1, Y_2, Y_3)\varepsilon(Z_2^{32})^4$.

21. A data encryption and decryption method operated by a processor, comprising:
in response to one single block cipher instruction, reading input data from a first system memory area, performing a block cipher algorithm on the input data based on an input key to encrypt or decrypt the input data to generate output data, and storing the output data in a second system memory area or an internal storage area within the processor and
providing a third register to store a control word that includes a plurality of mode setting bits for setting the block cipher algorithm to operate in an electronic code book mode, a cipher block chaining mode, a cipher feedback mode, an output feedback mode, and a counter mode.

22. The data encryption and decryption method as claimed in claim 21, wherein:
the single block cipher instruction is executed according to an input key pointer pointing to the input key, an input data pointer pointing to the input data, and an output pointer indicating where to store the output data.

23. The data encryption and decryption method as claimed in claim 21, further comprising:
according to the amount of input blocks carried in the input data, dividing the input data into input blocks;
performing N rounds of calculation on each input block to transform each input block into an output block, wherein the output blocks corresponding to the different input blocks are combined to form the output data, and N is an integer; and
based on the input key, generating N extension keys corresponding to the N rounds of calculation.

24. The data encryption and decryption method as claimed in claim 21, further comprising:
transforming the single block cipher instruction into a plurality of microinstructions based on microcode of the processor,
wherein, by executing the plurality of microinstructions, the block cipher algorithm is performed on the input data based on the input key.

25. The data encryption and decryption method as claimed in claim 24, further comprising:
executing an engine driving microinstruction within the plurality of microinstructions to operate a block cipher engine of the processor to perform N rounds of calculation on each input block of the input data to transform each input block into an output block, and N is an integer; and
combining output blocks corresponding to the different input blocks to form the output data.

26. The data encryption and decryption method as claimed in claim 25, further comprising:
transforming the input key into N extended keys to correspond to the N rounds of calculation of each input block; and
storing, in the order in which they were generated, the N extended keys as N sequential keys for encryption.

27. The data encryption and decryption method as claimed in claim 26, further comprising:
reversing the order of the N sequential key to generate N reversed-order keys; and
storing the N reversed-order keys for decryption.

28. The data encryption and decryption method as claimed in claim 27, further comprising:
based on the N sequential keys or the N reversed-order keys, performing the N rounds of calculation on each input block to transform each input block into an output block,
wherein:
when an encryption and decryption setting bit of a control word indicates an encryption operation, the N rounds of calculation on each input block is performed based on the N sequential keys; and
when the encryption and decryption setting bit indicates a decryption operation, the N rounds of calculation on each input block is performed based on the N reversed-order keys.

* * * * *